(12) United States Patent
Zhang et al.

(10) Patent No.: US 11,898,839 B2
(45) Date of Patent: Feb. 13, 2024

(54) MEASURING TAPE WITH IMPROVED ROLL-OVER PREVENTION

(71) Applicant: APEX BRANDS, INC., Apex, NC (US)

(72) Inventors: Kai Zhang, Charlotte, NC (US); Charles Wang, Charlotte, NC (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 17/800,962

(22) PCT Filed: Mar. 9, 2021

(86) PCT No.: PCT/US2021/021515
§ 371 (c)(1),
(2) Date: Aug. 19, 2022

(87) PCT Pub. No.: WO2021/183519
PCT Pub. Date: Sep. 16, 2021

(65) Prior Publication Data
US 2023/0072940 A1 Mar. 9, 2023

Related U.S. Application Data

(60) Provisional application No. 62/987,097, filed on Mar. 9, 2020.

(51) Int. Cl.
*G01B 3/1056* (2020.01)
*G01B 3/1071* (2020.01)

(52) U.S. Cl.
CPC ......... *G01B 3/1056* (2013.01); *G01B 3/1071* (2013.01); *G01B 2003/1076* (2013.01)

(58) Field of Classification Search
CPC ................ G01B 3/1056; G01B 3/1071; G01B 2003/1076
See application file for complete search history.

(56) References Cited

U.S. PATENT DOCUMENTS 6,370,790 B1 * 4/2002 Stenger ................ G01B 3/1056
33/770
6,663,153 B2 * 12/2003 Brunson .............. G01B 3/1071
294/2

(Continued)

OTHER PUBLICATIONS

International Search Report and Written Opinion from PCT/US2021/021515 dated May 20, 2021, all enclosed pages cited.

*Primary Examiner* — Yaritza Guadalupe-McCall
(74) *Attorney, Agent, or Firm* — Burr & Forman LLP (57) ABSTRACT

A measuring assembly for a measuring tape device may include a blade, an end hook and an anti-rollover attachment. The blade may include a first end configured to extend from an aperture in a housing of the measuring tape device and a second end configured to be wound on a reel assembly. The end hook may be disposed at the first end of the blade to engage an object for measurement, and may extend substantially perpendicular to a longitudinal centerline of the blade to extend away from an underside of the blade. The anti-rollover attachment may be disposed proximate to the end hook at the first end of the blade such that a center of gravity of the anti-rollover attachment is spaced apart from the underside of the blade. A combined weight of the end hook and the anti-rollover attachment may be in a range between about 10 grams and about 55 grams.

20 Claims, 8 Drawing Sheets

(56) References Cited

U.S. PATENT DOCUMENTS

| | | | | |
|---|---|---|---|---|
| 7,240,439 B2* | 7/2007 | Critelli | ............... | G01B 3/1056 33/DIG. 1 |
| 7,487,600 B1* | 2/2009 | Cooper | ............... | G01B 3/1056 33/770 |
| 8,375,595 B2* | 2/2013 | Murray | ............... | G01B 3/1071 33/768 |
| 8,528,222 B2* | 9/2013 | Murray | ............... | G01B 3/1071 33/768 |
| 2002/0185877 A1* | 12/2002 | Brunson | ............ | G01B 3/1071 294/65.5 |
| 2009/0064525 A1* | 3/2009 | Chen | ................... | G01B 3/1056 33/770 |
| 2009/0178291 A1* | 7/2009 | Huang | ............... | G01B 3/1056 33/758 |
| 2023/0072940 A1* | 3/2023 | Zhang | ............... | G01B 3/1071 |

* cited by examiner

MEASURING TAPE WITH IMPROVED ROLL-OVER PREVENTION

TECHNICAL FIELD

Example embodiments generally relate to measuring tape devices, and particularly relate to a measuring tape that has a blade designed to reduce the incidence of roll-over responsive to blade extension.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For measuring tapes having length in a range of about 12 ft to 50 ft, self-retracting mechanisms and using metallic tape ribbons for the tape (or blade) are very common.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing the end hook at one end of the tape, the user may take advantage of the standout to pay out the measuring tape toward an anchor point on a medium that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature. So much so, in fact, that it is not uncommon to see a user make multiple attempts to utilize standout and catch a remote end of media being measured with the end hook, rather than simply moving to the remote end of the media to manually fix the end hook to the remote end. When the standout is poor, and the user has to use multiple attempts, or fails and must resort to moving to the remote end to affix the end hook, time consuming and frustration may grow, and the user may seek out a measuring tape with better standout characteristics.

Invariably, each measuring tape will have a certain length that effectively defines the maximum standout that can be achieved before the tape bends and basically collapses. The measuring tape can no longer be extended reliably toward the anchor point once this collapse occurs. However, the collapse that occurs at maximum standout is not the only type of tape bending or collapse that can occur with metallic tape ribbons. In this regard, another collapse phenomena that can occur is called rollover. Rollover occurs when the blade is rotated about the longitudinal axis of the blade. The rotation of the blade about the longitudinal axis may be desirable when measuring vertical surfaces (e.g., walls, doors, windows, etc.).

For maximum standout, the blade is extended with the apex of the convex side of the cupped shape pointing straight toward the ground. As the blade is rotated about the longitudinal axis and extended, even typical blades that are designed or long standout will tend to collapse when the angle of rotation nears 90 degrees at around three or four feet of extension. Meanwhile, standout characteristics of some blades may enable extension of greater than 10 feet or 12 feet. Thus, it may be desirable to improve anti-rollover characteristics to decrease the gap between the maximum standout and the length at which rollover occurs.

BRIEF SUMMARY OF SOME EXAMPLES

Some example embodiments may enable the provision of a measuring tape that has improved anti-rollover characteristics.

In an example embodiment, a measuring tape device may be provided. The measuring tape device may include a housing having an aperture, a reel assembly enclosed within the housing and configured to alternately allow the blade to be withdrawn from the reel assembly through the aperture or received in the aperture onto the reel assembly, a blade having a first end configured to extend from the housing through the aperture and a second end configured to be wound on the reel assembly, an end hook and an anti-rollover attachment. The end hook may be disposed at the first end of the blade to engage an object for measurement. The end hook may extend substantially perpendicular to a longitudinal centerline of the blade to extend away from an underside of the blade. The anti-rollover attachment may be disposed proximate to the end hook at the first end of the blade such that a center of gravity of the anti-rollover attachment is spaced apart from the underside of the blade. A combined weight of the end hook and the anti-rollover attachment may be in a range between about 10 grams and about 55 grams.

In another example embodiment, a measuring assembly for a measuring tape device may be provided. The assembly may include a blade, an end hook and an anti-rollover attachment. The blade may include a first end configured to extend from an aperture in a housing of the measuring tape device and a second end configured to be wound on a reel assembly. The end hook may be disposed at the first end of the blade to engage an object for measurement, and may extend substantially perpendicular to a longitudinal centerline of the blade to extend away from an underside of the blade. The anti-rollover attachment may be disposed proximate to the end hook at the first end of the blade such that a center of gravity of the anti-rollover attachment is spaced apart from the underside of the blade. A combined weight of the end hook and the anti-rollover attachment may be in a range between about 10 grams and about 55 grams.

In another example embodiment, a measuring assembly for a measuring tape device may be provided. The assembly may include a blade, and an end hook. The blade may include a first end configured to extend from an aperture in a housing of the measuring tape device and a second end configured to be wound on a reel assembly. The end hook may be disposed at the first end of the blade to engage an object for measurement, and may extend substantially perpendicular to a longitudinal centerline of the blade to extend away from an underside of the blade. A portion of the end hook that is disposed at the first end of the blade such that a center of gravity of the portion of the end hook is spaced apart from the underside of the blade has a weight greater than about 15 grams.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
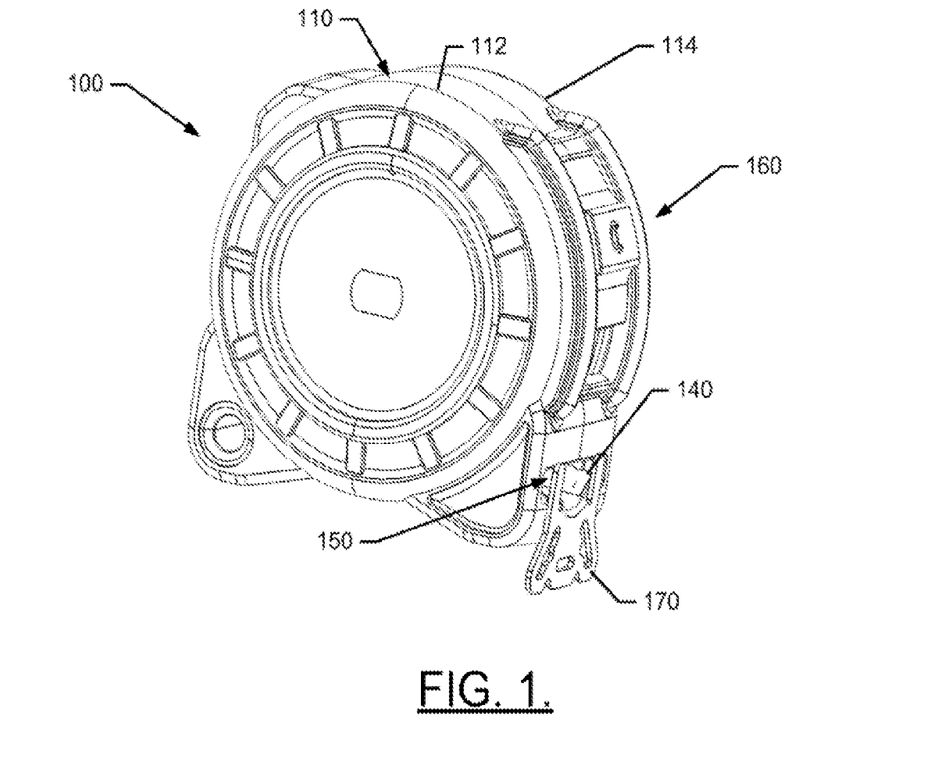
FIG. 1 illustrates a perspective view of a measuring tape device in accordance with an example embodiment.

As indicated above, some example embodiments may relate to the provision of a measuring tape device that may have an improved blade design for resistance to rollover. This may be accomplished by providing an anti-rollover attachment at a distal end and bottom side of the blade (e.g., proximate to the end hook). FIG. 1 illustrates a perspective view of a measuring tape device, FIG. 2 illustrates a block diagram of such device, in accordance with an example embodiment, and FIG. 3 (which is defined by FIGS. 3A and 3B) illustrates a front view of the blade of the measuring tape device.

Figure 2:
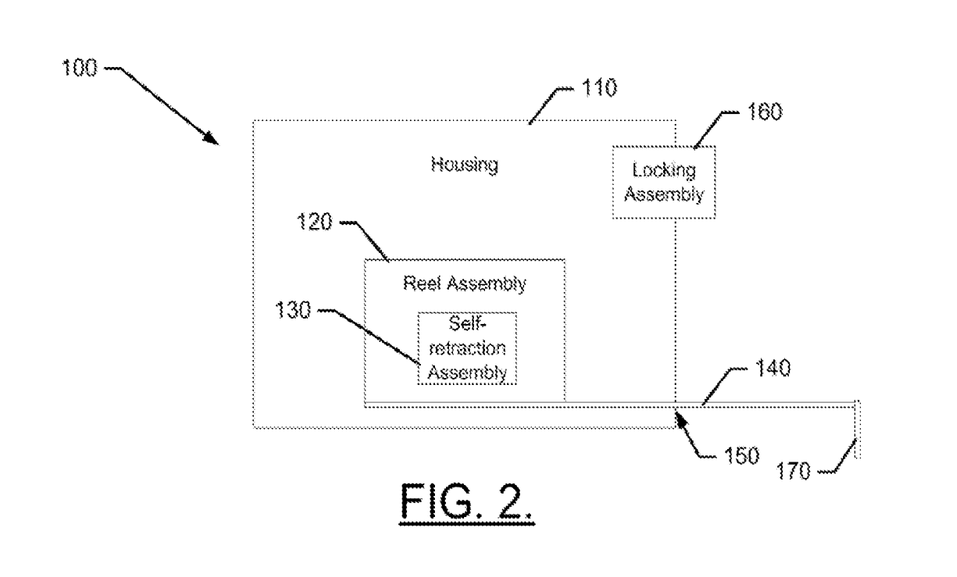
FIG. 2 illustrates a block diagram of the measuring tape device in accordance with an example embodiment.
Figure 3A:
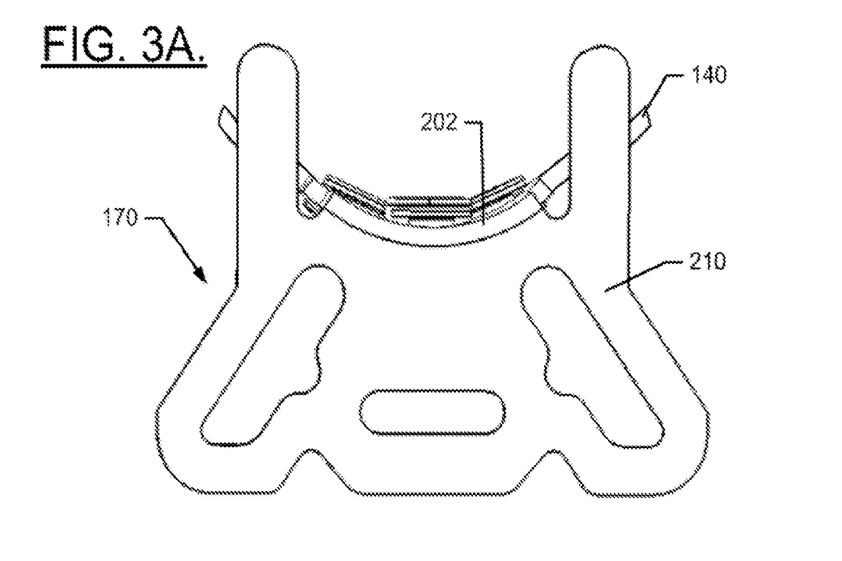
FIG. 3A illustrates a front view of the end hook in a normal orientation in accordance with an example embodiment.
Figure 3B:
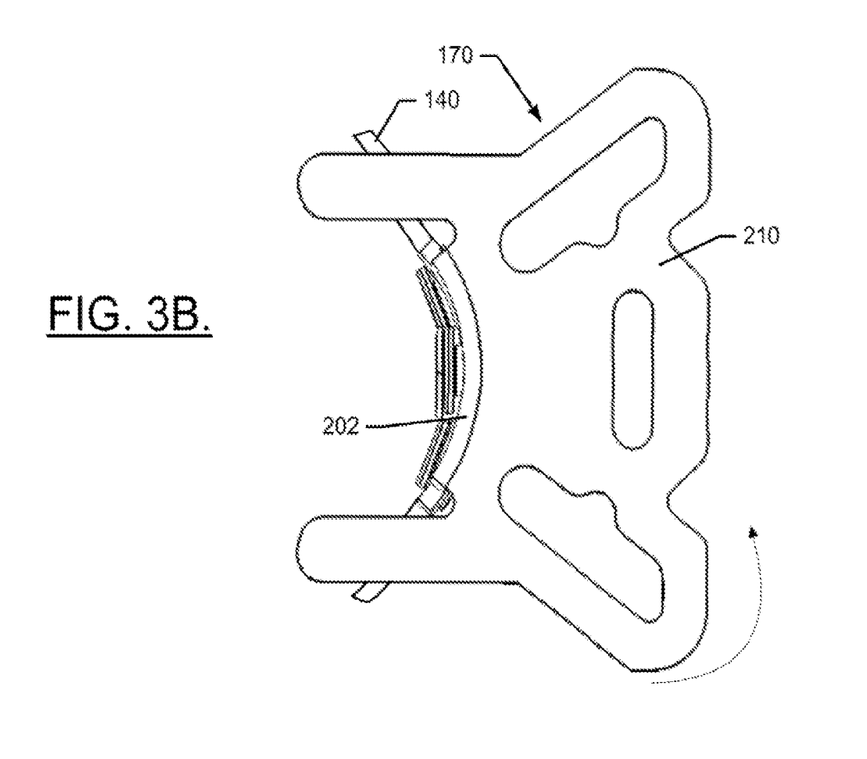
FIG. 3B illustrates the end hook rotated about ninety degrees about a longitudinal axis of the blade in accordance with an example embodiment.

Referring now to FIGS. 1-3, a measuring tape device 100 of an example embodiment may include a housing 110 that, to simplify manufacture, may include a first case half 112 and a second case half 114. The first and second case halves 112 and 114 may house a reel assembly 120 and a self-retraction assembly 130 therein. A blade 140 (or tape) portion of the device 100 may be wound onto the reel assembly 120. The blade 140 may be paid out through an aperture 150 formed in the housing 110. A locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 at a length of maximum standout generally occurs at a portion of the blade 140 that can be referred to as a "critical region" since it can occur at slightly different points (but generally in the same region) on different extension operations, and on different individual measuring tapes.

It may be possible to increase the standout capabilities of the blade 140 by changing certain characteristics of the blade 140. For example, the cupping of the blade 140 such that a convex curve having an apex that is generally faced toward the ground when the blade 140 is extended to achieve maximum standout is well known to improve standout of the blade 140. This is the orientation shown in FIG. 3A. However, the blade 140 is not always paid out in this orientation. To the contrary, in some cases, measurement of vertical surfaces or structures may call for paying the blade 140 out of the housing 110 at an angled orientation (e.g., rotated about the longitudinal axis of the blade 140 as much as by 90 degrees, and generally at greater than 60 degrees). FIG. 3B shows the blade 140 and end hook 170 rotated by 90 degrees so that the apex of the convex side of the cupped blade is now rotated 90 degrees and to the viewer's right. For a typical blade that is constructed to have improved standout, a collapse or bending phenomenon referred to as rollover (which is similar to that which occurs at maximum standout in terms of the collapse or bending of the blade 140 that occurs) can occur at a corresponding critical region for rollover. The critical region for rollover for many cupped blades tends to occur at between three to four feet of extension out of the housing 110.

This critical region for rollover can, however, be extended by modifying the weight balance near the end hook 170 of the blade 140. In this regard, by adding an anti-rollover attachment 200 to an underside of the blade 140 (i.e., for a cupped blade, the side of the blade on which the apex of the convex side of the cupping is formed), the critical region for rollover can be extended by greater than 20 percent, and in some cases more than 50 percent. For example, a blade 140 having a critical region for rollover at about 3 feet can have the critical region for rollover extended to greater than 5 feet (and increase of more than 50%). The anti-rollover attachment 200 can take a number of forms, and can be either a permanent feature or a removable feature. Moreover, the anti-rollover attachment 200 can also be placed either on the end hook 170 itself, or on the underside of the blade 140 (i.e., proximate to the convex side of the apex).

The anti-rollover attachment 200 may be a weighted attachment that is configured to add weight to the underside of the blade 140 at the distal end of the blade 140 and add stability that improves the resistance of the blade 140 to rollover. The amount and location of the weight used for the anti-rollover attachment 200 can impact both the standout (e.g., by decreasing standout due to the addition of weight at the distal end of the blade 140) and the rollover resistance (e.g., by increasing rollover resistance due to the addition of the weight at the distal end and underside of the blade 140). For a nominal blade 140 having a cupped width of approximately one inch (and therefore a flat width around 1.2 inches), and cupped height in a range between about 0.28 inches to about 0.4 inches, using a weight in a range between about 15 g to about 50 g has been demonstrated to provide a good balance between increasing rollover resistance and impact on standout for an example in which the end hook 170 weighs about 5 g. Thus, the total weight at or near the distal end of the blade 140 (i.e., on the underside thereof) may be between about 20 g and about 55 g to achieve optimal improvement.

Accordingly, one option for implementing a permanent or fixed version of the anti-rollover attachment 200 may simply be to add weight to the end hook 170 to make the end hook 170 (including extension portion 202) have a total weight of between about 10 g and about 55 g as long as the extension portion 202 is entirely on the underside of the blade 140, or at least a sufficient portion thereof is on the underside of the blade 140 to achieve a total of between about 10 g and 55 g on the underside of the distal end of the blade 140. This can, of course, be accomplished by simply using more, heavier and/or thicker material for the end hook 170 and/or the extension portion 202. The end hook 170 and/or the extension portion 202 may therefore be made larger, thicker and/or heavier to achieve the desired weight. However, since the extension portion 202 typically extends over a top surface (i.e., the concave portion of the cupped blade), and since a rear face of the end hook 170 (i.e., the face that is directed toward the blade 140) engages the medium that is to be measured, it may not be convenient or desirable to simply oversize these components. As such, the anti-rollover attachment 200 may instead be added as a separate component. However, if a single unitary and heavier end hook is preferred, the portion of the end hook 170 that is disposed at the first end of the blade 140 such that a center of gravity of the portion of the end hook 170 is spaced apart from the underside of the blade 140 may have a weight greater than about 15 grams.

The end hook 170, which is often made of a metallic material such as steel or other sheet metal cut and/or shaped to have a desired form, is often operably coupled to the blade 140 via one or more fasteners that extend through the distal end of the blade 140 and the extension portion 202 of the end hook 170. The extension portion 202 is often part of the same unitary piece of metal as the end hook 170, but is bent at a 90 degree angle relative to the end hook 170. The extension portion 202 extends along the blade 140 inwardly from the distal end thereof and is typically disposed on the top side of the apex of the blade 140. Thus, one option for providing the anti-rollover attachment 200 may be to manufacture a separate component that can be added to the end hook 170 and/or the blade 140 (e.g., proximate the extension portion 202) in either a permanent (fixed) or removable way.

Given that the end hook 170, the blade 140 and the extension portion 202 may be made of a metallic material with good magnetic properties (e.g., steel), one option for operably coupling the anti-rollover attachment 200 to the distal end of the blade 140 in a removable way may be to form the anti-rollover attachment 200 as a magnet, or otherwise include one or more magnets in the anti-rollover attachment 200. The magnet or magnets of the anti-rollover attachment 200 may therefore allow the anti-rollover attachment 200 to be attached to either (or in some cases both) of the underside of the blade 140 (proximate to the end hook 170) or to the front face of the end hook 170 (i.e., the face that faces away from the blade 140).

As an alternative, the anti-rollover attachment 200 could be affixed to the underside of the blade 140 or the front face of the end hook 170 in a permanent, fixed or non-removable configuration. One or more fasteners may be used to affix the anti-rollover attachment 200 to the blade 140 or end hook 170 in such examples.

Figure 4A:
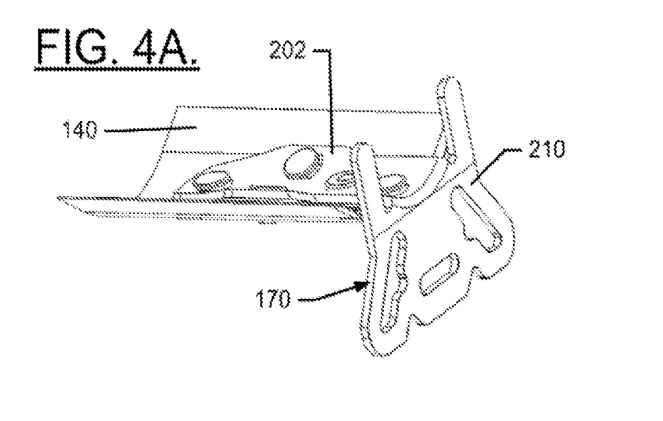
FIG. 4A illustrates a perspective view of the blade and end hook prior to attachment of an anti-rollover attachment of an example embodiment.
Figure 4B:
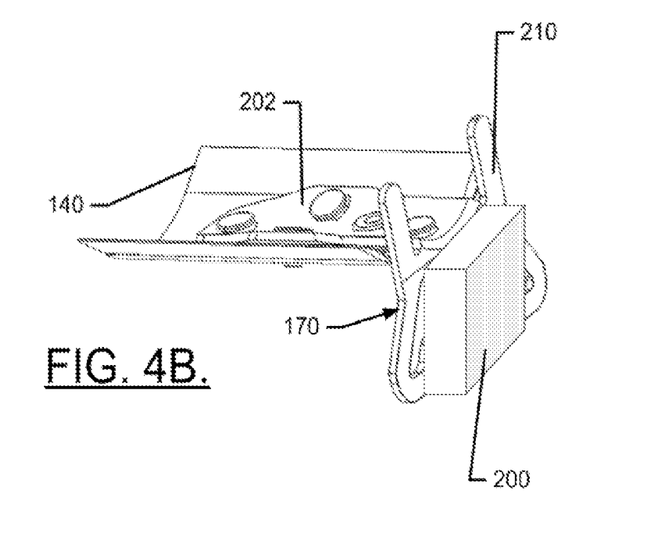
FIG. 4B illustrates a perspective view of the blade and end hook of FIG. 4A with a removable instance of the anti-rollover attachment applied to the end hook in accordance with an example embodiment.

FIG. 4A shows a perspective view of the distal end of the blade 140 without the anti-rollover attachment 200. FIG. 4B illustrates the same perspective view of the blade 140, but with the anti-rollover attachment 200 embodied as a magnet that attaches to a front face 210 of the end hook 170. Thus, the anti-rollover attachment 200 of FIG. 4B is removable. In general, the anti-rollover attachment 200 may be removed if rollover protection is not desired or required (or to maximize standout). But if rollover protection is desired, the user can put the anti-rollover attachment 200 on the end hook 170 in a manner similar to that shown in FIG. 4B. The placement of the weight of the anti-rollover attachment 200 on the underside of the blade 140 (albeit forward of the end hook 170) provides a force to counteract rollover tendencies and enhances the amount of the blade 140 that can be extended from the housing 110 while the blade 140 is rotated about its longitudinal axis as much as 90 degrees. As noted above, the enhancement provided may be achieved by as little as adding 10 g. However, by adding a weight of at least 20 g the improvement may be as much as 50 percent.

Figure 4C:
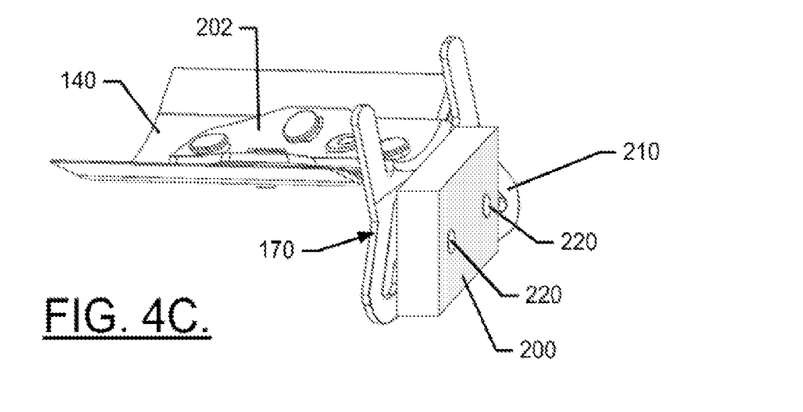
FIG. 4C illustrates a perspective view of the blade and end hook of FIG. 4A with a permanently fixed anti-rollover attachment applied to the end hook in accordance with an example embodiment.

As an alternative to applying the anti-rollover attachment 200 to the end hook 170 on a temporary basis, one or more fasteners 220 may be used to affix the anti-rollover attachment 200 to the end hook 170 on a permanent basis as shown in FIG. 4C. In FIG. 4C, the fasteners 220 may pass through the anti-rollover attachment 200 and through the end hook 170. As yet another alternative, the fasteners 220 may be replaced by (or embodied as) snap fittings that can releasably engage openings formed in the end hook 170 to provide another means by which to embody a releasable version of the anti-rollover attachment 200.

Figure 5A:
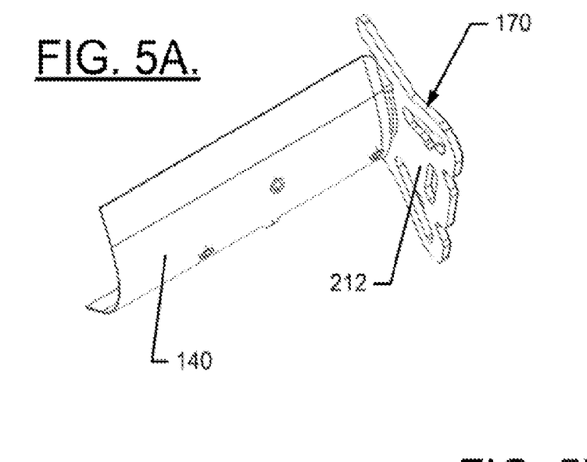
FIG. 5A illustrates a perspective view of the blade and end hook prior to attachment of the anti-rollover attachment of another example embodiment.
Figure 5B:
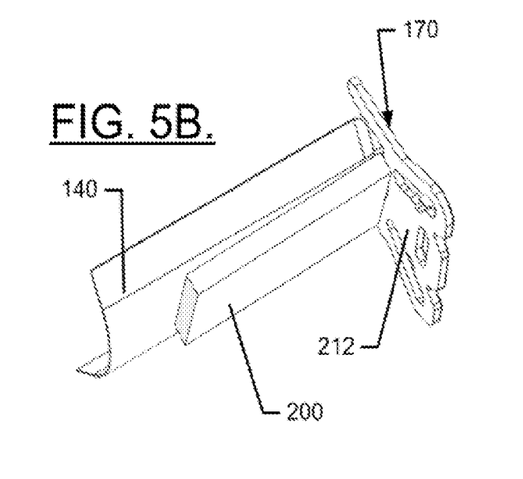
FIG. 5B illustrates a perspective view of the blade and end hook of FIG. 5A with a removable instance of the anti-rollover attachment applied to the blade in accordance with an example embodiment.
Figure 5C:
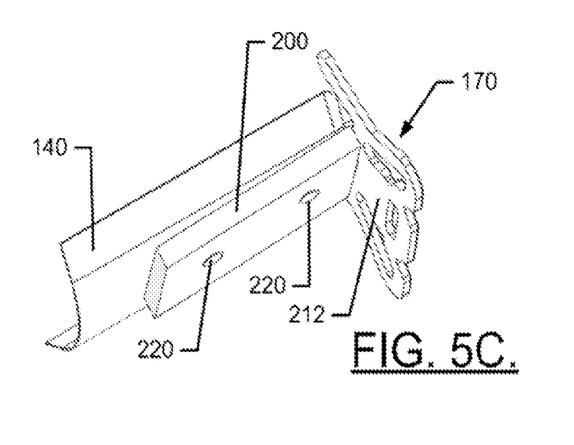
FIG. 5C illustrates a perspective view of the blade and end hook of FIG. 5A with a permanently fixed anti-rollover attachment applied to the blade in accordance with an example embodiment.

As noted above, instead of applying the anti-rollover attachment 200 to the end hook 170 (and particularly to the front face 210 of the end hook 170), the anti-rollover attachment 200 could be attached at the underside of the blade 140 (e.g., at the apex of the convex side of the blade 140 for a cupped blade). FIG. 5A illustrates a perspective view of the underside of the blade 140 before application of the anti-rollover attachment 200 in accordance with an example embodiment. FIG. 5B shows the same view of the blade 140, but with the anti-rollover attachment 200 applied thereto on a removable basis. FIG. 5C shows the anti-rollover attachment 200 permanently attached to the blade 140 of FIG. 5A.

Referring to FIG. 5B, the metallic nature of the blade 140 and the extension portion 202 may allow the anti-rollover attachment 200 to, when including magnets or embodied as a magnet, be applied to the underside of the blade 140 proximate to and extending away from the rear face 212 (i.e., the face opposite the front face 210, and facing toward the blade 140) of the end hook 170. Thus, the example of FIG. 5B also shows an option for operably coupling the anti-rollover attachment 200 to the distal end of the blade 140 in a removable way. As an alternative to removable coupling, the fasteners 220 shown in FIG. 5C may pass through both the anti-rollover attachment 200 and the blade 140 to attach the the anti-rollover attachment 200 to the distal end of the blade 140.

The shape and size of the anti-rollover attachment 200 may vary, when the weight of the anti-rollover attachment 200 is within the range described above (e.g., a total weight of between 20 g and 55 g). However, by providing the anti-rollover attachment 200 as a rectangular shaped component, more flexible utility may be achieved. For example, by having the anti-rollover attachment 200 take a rectangular form, the length and/or width of the anti-rollover attachment 200 may be kept to within a range of about 80 percent to about 100 percent of the width of the blade 140 and/or the end hook 170. This may ensure that when the anti-rollover attachment 200 is provided on either the underside of the blade 140 or the front face 210 of the end hook 170, the edges of the anti-rollover attachment 200 will not spill over the sides of the blade 140 or the end hook 170 to facilitate catching on other materials or components (which may separate the anti-rollover attachment 200 from the blade 140 or end hook 170 in some cases). A rectangular shape may also facilitate easy storage of the anti-rollover attachment 200 when the anti-rollover attachment 200 is removable.

Figure 6A:
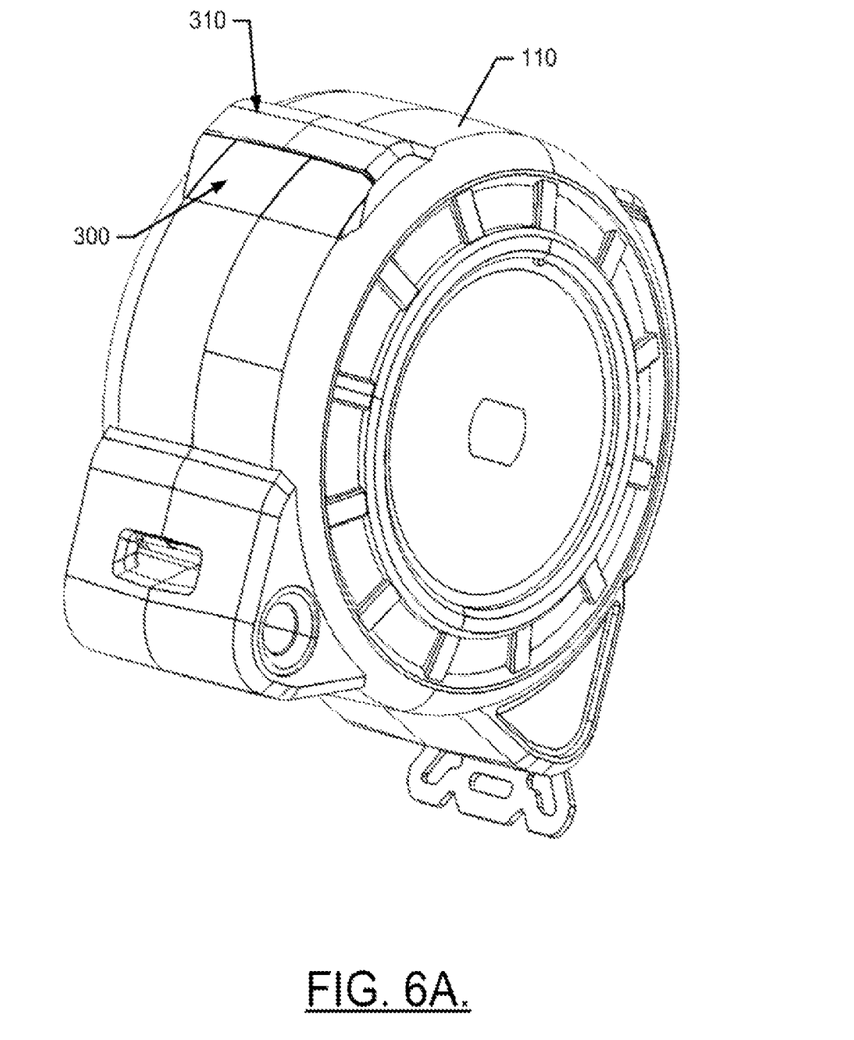
FIG. 6A illustrates a perspective view of a pocket and receiving space formed in the housing of the measuring tape device in accordance with an example embodiment.
Figure 6B:
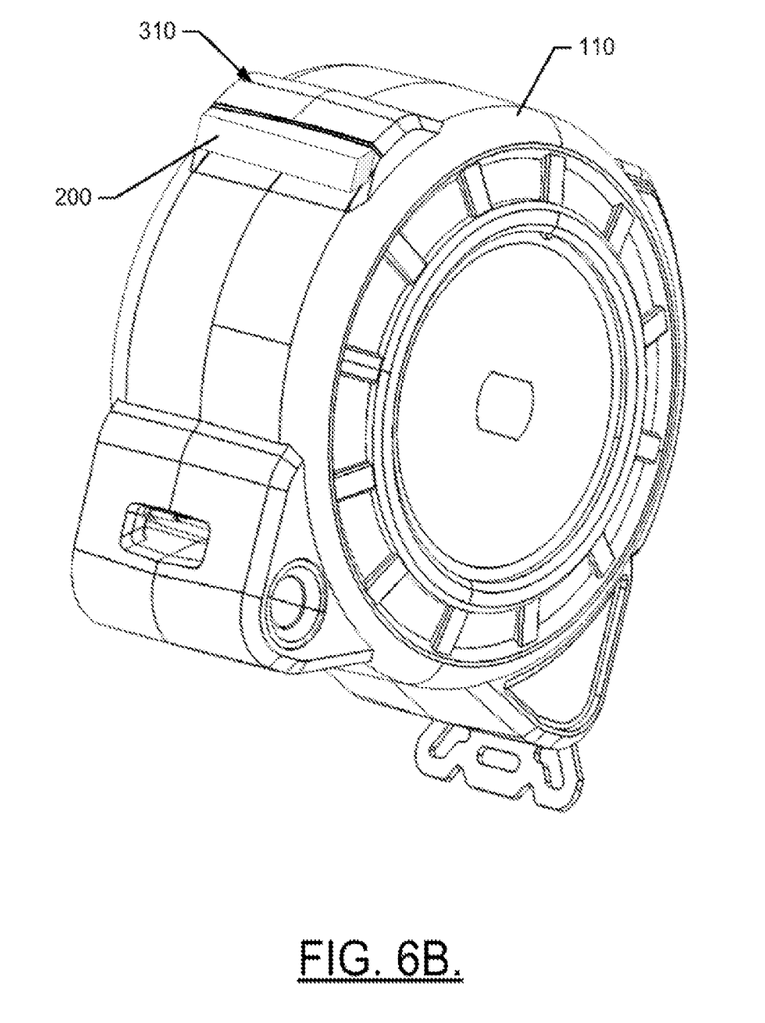
FIG. 6B illustrates the anti-rollover attachment inserted into the pocket of FIG. 6A in accordance with an example embodiment.

In this regard, for example, FIG. 6A shows a perspective view of the housing 110 of the measuring tape device 100 modified to include a receiving space 300 formed by a pocket 310 that may be provided at a portion of the housing 110. The anti-rollover attachment 200 may be slid into the receiving space 300 and retained therein by either a magnet (e.g., if the anti-rollover attachment 200 is magnetic) or friction fittings located in the pocket 310 to engage and retain the anti-rollover attachment 200 therein. If magnetic, the anti-rollover attachment 200 could also simply be retained at another portion (i.e., a metallic portion) of the housing 110 without need for the formation of the pocket 310 on the housing 110.

The examples described above assume that the anti-rollover attachment 200 is formed as a solid mass. The solid mass could be one unitary material (either magnetic in nature or non-magnetic), or could include separate magnets embedded therein. Such a construction may be relatively easy to form, and place on the end hook 170 or the blade 140 in the manner described above, and may have a center of gravity roughly at a center of the anti-rollover attachment 200. Such a simple structure may also, by placing a fixed center of gravity of the anti-rollover attachment 200 on the underside of the blade 140, provide the advantages in rollover prevention described above. However, it may also be possible to employ a more complex structure that has a variable center of gravity.

Figure 7:
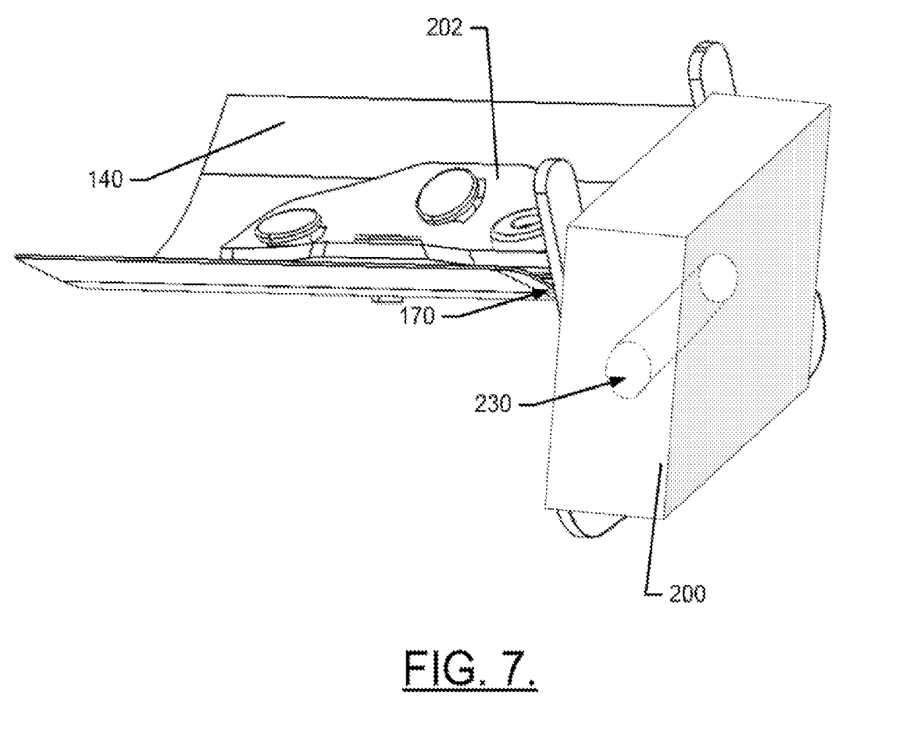
FIG. 7 illustrates a perspective view of the anti-rollover attachment with a channel formed therein in accordance with an example embodiment.

FIG. 7 illustrates an example in which the anti-rollover attachment 200 has an internal channel 230 formed therein. The internal channel 230 may be a hollow portion within the anti-rollover attachment 200, and the internal channel 230 can therefore be filled with a material that shifts as the anti-rollover attachment 200 is rotated. For example, if the internal channel 230 is formed as a cylinder, a metallic slug or liquid metal therein may be free to move from one end of the cylinder to the other as the anti-rollover attachment 200 is rotated to change its orientation. This construction may still allow simple and easy placement of the anti-rollover attachment 200 on the blade 140 or end hook 170, but may shift the center of gravity of the anti-rollover attachment 200 lower after rotation (e.g., toward 90 degrees shown in FIG. 3B). The lower center of gravity may improve stability even further in some cases.

Figure 8:
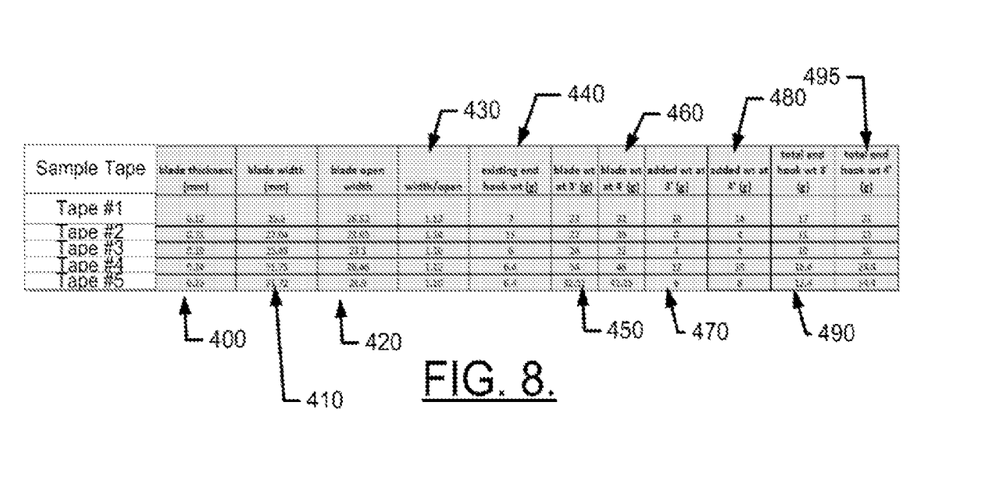
FIG. 8 illustrates a table of measured parameters for a number of sample blades to prevent rollover at three feet and four feet, respectively.

FIG. 8 illustrates a table of measured parameters for a number of sample blades to prevent rollover at three feet and four feet, respectively. In this regard, five different sample tapes (i.e., tape 1, tape 2, tape 3, tape 4 and tape 5) were tested. Blade thickness (column 400) was measured in mm for each blade along with a blade width (i.e., a flat width) and blade open width (i.e., curved width) of the blades in columns 410 and 420, respectively. A ratio of blade width to blade open width is then calculated for each of the sample tapes and is shown in column 430. Column 440 shows the weight (in grams) of the end hook for each of the sample tapes. Column 450 shows the total weight (excluding the end hook) of three feet of the blade for each respective one of the sample tapes, and column 460 shows the total weight of four feet of the respective blades. Column 470 shows an amount of weight added to the end hook to avoid rollover at the feet of extension or standout for each of the sample tapes. Thus, it can be appreciated that tape #2, which had the heaviest end hook by far, did not rollover at three feet of extension (rotated to about 90 degrees about the longitudinal axis of the blade). Column 480 shows the amount of weight added to the end hook to prevent rollover at four feet of extension. Thus, even tape #2 experienced rollover by four feet of extension. Column 490 shows the total weight of the end hook and added weight at three feet to prevent rollover, and column 495 shows the total weight of the end hook and added weight to prevent rollover at four feet of extension. In all cases, adding weight to the end hook improved the amount of extension that could be achieved before rollover was experienced.

Figure 9:
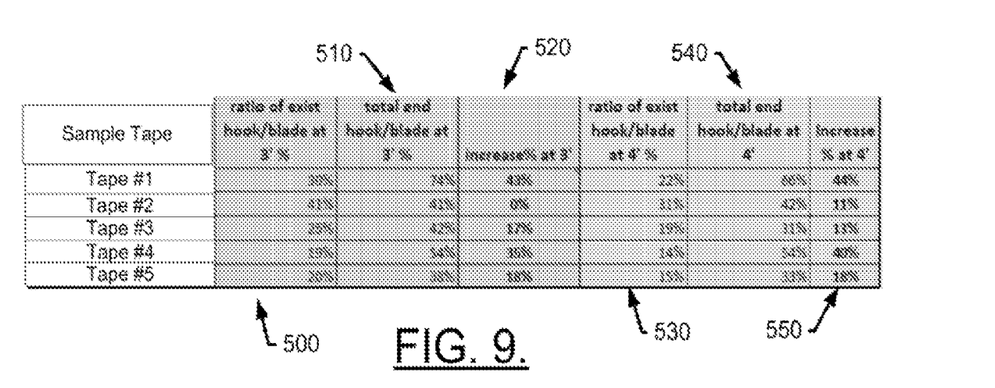
FIG. 9 illustrates a table of ratios of end hook weights to blade weights at three and four feet for the sample blades of FIG. 8.

FIG. 9 illustrates a table of ratios of end hook weights to blade weights at three and four feet for the sample blades of FIG. 8. In this regard, column 500 shows a ratio of end hook to blade weight for each of the sample tapes at three feet of extension (i.e., without any added weight). Meanwhile, column 510 shows a ratio of end hook to blade weight for each of the sample tapes at three feet of extension with minimum weight added to avoid rollover. Column 520 shows the percentage increase from column 500 to column 510. As can be appreciated from the data shown in columns 500 to 520, a ratio of greater than 40% of end hook weight to blade weight appears to avoid rollover at three feet of extension. Tape #2 meets this ratio as designed, due to its heavy end hook, and therefore can avoid rollover at three feet of extension. Additionally, since tape #1 is the thinnest and lightest blade, tape #1 requires a higher ratio of end hook weight to blade weight to avoid rollover.

Column 530 shows a ratio of end hook to blade weight for each of the sample tapes at four feet of extension (i.e., without any added weight). Meanwhile, column 540 shows a ratio of end hook to blade weight for each of the sample tapes at four feet of extension with minimum weight added to avoid rollover. Column 550 shows the percentage increase from column 530 to column 540. As can be appreciated from the data shown in columns 530 to 550, an increase of at least 10% is required for each of the sample tapes in order to avoid rollover at four feet. The data in FIGS. 8 and 9 therefore clearly shows that by adding weight to the end hook, a better rollover performance is achieved. Moreover, although blade weight, thickness and end hook weight all play a role in determining rollover performance, the addition of weight to the end hook in the amounts or ranges described herein can be expected to substantially improve tolerance to rollover. For all tapes tested, the improvement in performance extends rollover to beyond four feet of extension.

In an example embodiment, a measuring tape device may be provided. The measuring tape device may include a housing having an aperture, a reel assembly enclosed within the housing and configured to alternately allow the blade to be withdrawn from the reel assembly through the aperture or received in the aperture onto the reel assembly, a blade having a first end configured to extend from the housing through the aperture and a second end configured to be wound on the reel assembly, an end hook and an anti-rollover attachment. The end hook may be disposed at the first end of the blade to engage an object for measurement. The end hook may extend substantially perpendicular to a longitudinal centerline of the blade to extend away from an underside of the blade. The anti-rollover attachment may be disposed proximate to the end hook at the first end of the blade such that a center of gravity of the anti-rollover attachment is spaced apart from the underside of the blade. A combined weight of the end hook and the anti-rollover attachment may be in a range between about 10 grams and about 55 grams.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, in some cases the anti-rollover attachment may have a weight of between about 15 grams and about 50 grams. In an example embodiment, the anti-rollover attachment may be removable from the end hook. In some cases, the anti-rollover attachment may include a magnetic material configured to enable the magnetic material to adhere the anti-rollover attachment to the front face of the end hook. In an example embodiment, the anti-rollover attachment may be permanently affixed to the front face of the end hook. In some cases, the anti-rollover attachment may be operably coupled to the underside of the blade proximate to a rear face of the end hook. In an example embodiment, the anti-rollover attachment may be removable from the underside of the blade. In some cases, the anti-rollover attachment may include a magnetic material configured to enable the magnetic material to adhere the anti-rollover attachment to the front face of the end hook. In an example embodiment, the anti-rollover attachment may be permanently affixed to the underside of the blade. In some cases, the housing may include a pocket forming a receiving space, the anti-rollover attachment may be removable, and when the anti-rollover attachment is removed from the first end of the blade, the anti-rollover attachment may be configured to be inserted into the receiving space for retention by the pocket. In an example embodiment, the anti-rollover attachment may include an internal channel filled with a material that shifts as the anti-rollover attachment is rotated about the longitudinal centerline of the blade.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A measuring tape device comprising:
a housing having an aperture;
a reel assembly enclosed within the housing, the reel assembly being configured to alternately allow the blade to be withdrawn from the reel assembly through the aperture or received in the aperture onto the reel assembly;
a blade having a first end configured to extend from the housing through the aperture and a second end configured to be wound on the reel assembly;
an end hook disposed at the first end of the blade to engage an object for measurement, the end hook extending substantially perpendicular to a longitudinal centerline of the blade to extend away from an underside of the blade; and
an anti-rollover attachment is operably coupled to the end hook at the first end of the blade such that a center of gravity of the anti-rollover attachment is disposed proximate to the end hook and lower than the underside of the blade,
wherein a combined weight of the end hook and the anti-rollover attachment is in a range between about 10 grams and about 55 grams.

2. The device of claim 1, wherein the end hook comprises a front face facing away from the measuring tape device in a direction of extension of the blade and a rear face facing toward the measuring tape device opposite the direction of extension of the blade, and
wherein the anti-rollover attachment is operably coupled to the front face of the end hook.

3. The device of claim 2, wherein the anti-rollover attachment has a weight of between about 15 grams and about 50 grams.

4. The device of claim 2, wherein the anti-rollover attachment is removable from the end hook.

5. The device of claim 4, wherein the anti-rollover attachment comprises a magnetic material configured to enable the magnetic material to adhere the anti-rollover attachment to the front face of the end hook.

6. The device of claim 2, wherein the anti-rollover attachment is permanently affixed to the front face of the end hook.

7. The device of claim 1, wherein the anti-rollover attachment is operably coupled to the underside of the blade proximate to a rear face of the end hook.

8. The device of claim 7, wherein the anti-rollover attachment is removable from the underside of the blade.

9. The device of claim 8, wherein the anti-rollover attachment comprises a magnetic material configured to enable the magnetic material to adhere the anti-rollover attachment to the front face of the end hook.

10. The device of claim 7, wherein the anti-rollover attachment is permanently affixed to the underside of the blade.

11. The device of claim 1, wherein the housing comprises a pocket forming a receiving space,
wherein the anti-rollover attachment is removable, and
wherein when the anti-rollover attachment is removed from the first end of the blade, the anti-rollover attachment is configured to be inserted into the receiving space for retention by the pocket.

12. The device of claim 1, wherein a ratio of the combined weight of the end hook and the anti-rollover attachment to blade extension at 4 feet is greater than 31%.

13. A measuring assembly for a measuring tape device, the assembly comprising:
a blade having a first end configured to extend from an aperture in a housing of the measuring tape device and a second end configured to be wound on a reel assembly;
an end hook disposed at the first end of the blade to engage an object for measurement, the end hook extending substantially perpendicular to a longitudinal centerline of the blade to extend away from an underside of the blade; and
an anti-rollover attachment is operably coupled to the end hook at the first end of the blade such that a center of gravity of the anti-rollover attachment is disposed proximate to the end hook and lower than the underside of the blade,
wherein a combined weight of the end hook and the anti-rollover attachment is in a range between about 10 grams and about 55 grams.

14. The assembly of claim 13, wherein the anti-rollover attachment is operably coupled to a front face of the end hook, and
wherein the anti-rollover attachment comprises a magnetic material configured to enable the magnetic material to removably adhere the anti-rollover attachment to the front face of the end hook.

15. The assembly of claim 14, wherein the anti-rollover attachment is permanently affixed to the front face of the end hook.

16. The assembly of claim 13, wherein the anti-rollover attachment is operably coupled to the underside of the blade proximate to a rear face of the end hook.

17. The assembly of claim 16, wherein the anti-rollover attachment is removable from the underside of the blade.

18. The assembly of claim 17, wherein the anti-rollover attachment comprises a magnetic material configured to enable the magnetic material to adhere the anti-rollover attachment to the front face of the end hook.

19. The assembly of claim 16, wherein the anti-rollover attachment is permanently affixed to the underside of the blade.

20. A measuring assembly for a measuring tape device, the assembly comprising:
a blade having a first end configured to extend from an aperture in a housing of the measuring tape device and a second end configured to be wound on a reel assembly; and
an end hook disposed at the first end of the blade to engage an object for measurement, the end hook extending substantially perpendicular to a longitudinal centerline of the blade to extend away from an underside of the blade,
wherein a portion of the end hook that is disposed at the first end of the blade such that a center of gravity of the portion of the end hook is lower than the underside of the blade has a weight greater than about 15 grams.

* * * * *